United States Patent
Diaz-Cuellar et al.

(10) Patent No.: US 11,809,611 B2
(45) Date of Patent: Nov. 7, 2023

(54) PROTECTING DEVICE DETACHMENT WITH BUS ENCRYPTION

(71) Applicant: Microsoft Technology Licensing, LLC, Redmond, WA (US)

(72) Inventors: Gerardo Diaz-Cuellar, Woodinville, WA (US); Venkata Subrahmanyam Raman, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/799,252

(22) Filed: Feb. 24, 2020

(65) Prior Publication Data

US 2021/0264064 A1    Aug. 26, 2021

(51) Int. Cl.
| | |
|---|---|
| G06F 21/79 | (2013.01) |
| G06F 13/42 | (2006.01) |
| G06F 21/44 | (2013.01) |
| G06F 21/60 | (2013.01) |
| G06F 21/85 | (2013.01) |
| H04L 9/08 | (2006.01) |

(52) U.S. Cl.
CPC .......... *G06F 21/79* (2013.01); *G06F 13/4221* (2013.01); *G06F 21/44* (2013.01); *G06F 21/602* (2013.01); *G06F 21/85* (2013.01); *H04L 9/0816* (2013.01); *H04L 9/0897* (2013.01); *G06F 2213/0024* (2013.01)

(58) Field of Classification Search
CPC ...... G06F 21/79; G06F 13/4221; G06F 21/44; G06F 21/602; G06F 21/85; G06F 2213/0024; H04L 9/0816; H04L 9/0897
See application file for complete search history.

(56) References Cited

U.S. PATENT DOCUMENTS 5,887,063 A * 3/1999 Varadharajan .......... H04L 63/18
713/172
6,799,273 B1* 9/2004 Oishi ............... G11B 20/00528
713/169

(Continued)

FOREIGN PATENT DOCUMENTS

CN    103457722 A  * 12/2013
WO    2017136069 A1    8/2017

OTHER PUBLICATIONS

Search Query Report from IP.com (performed Apr. 16, 2021) (Year: 2021).*

(Continued)

*Primary Examiner* — Sharon S Lynch
(74) *Attorney, Agent, or Firm* — RAY QUINNEY & NEBEKER (57) ABSTRACT

The present disclosure relates to devices and methods for protecting data from physical attacks. The devices and methods may establish an encryption protocol to encrypt data transmitted over a bus to one or more removable devices in communication with a computer device. The devices and methods may use the encryption protocol to communicate with the removal devices and perform storage requests at the removal devices. The devices and methods may also perform another layer of encryption on the data stored at the removal devices using a data at rest key stored on the removal devices.

18 Claims, 4 Drawing Sheets

(56) References Cited

U.S. PATENT DOCUMENTS

| | | | | |
|---|---|---|---|---|
| 7,562,219 | B2* | 7/2009 | Lazaridis | H04W 12/041 |
| | | | | 713/168 |
| 7,822,994 | B2 | 10/2010 | Hamaguchi | |
| 7,945,788 | B2* | 5/2011 | Roberts | G06F 21/79 |
| | | | | 713/192 |
| 8,589,667 | B2* | 11/2013 | Mujtaba | G06F 21/78 |
| | | | | 713/168 |
| 9,152,797 | B2* | 10/2015 | Bilke | G06F 21/60 |
| 9,430,664 | B2* | 8/2016 | Adam | H04L 63/0428 |
| 9,515,823 | B2* | 12/2016 | Winslow | H04W 12/04 |
| 9,811,682 | B2* | 11/2017 | Ingalls | H04L 9/0894 |
| 9,871,787 | B2 | 1/2018 | Gale | |
| 9,942,033 | B2* | 4/2018 | Winslow | H04W 12/0431 |
| 10,740,466 | B1* | 8/2020 | Bshara | G06F 21/6218 |
| 10,936,735 | B2* | 3/2021 | Paterra | H04L 9/3263 |
| 2003/0028765 | A1* | 2/2003 | Cromer | G06F 21/85 |
| | | | | 713/164 |
| 2003/0093683 | A1* | 5/2003 | Wong | G06F 21/126 |
| | | | | 713/189 |
| 2003/0163717 | A1* | 8/2003 | Yoshimoto | G06F 21/78 |
| | | | | 713/193 |
| 2004/0117642 | A1* | 6/2004 | Mowery | G06F 21/79 |
| | | | | 713/193 |
| 2004/0250087 | A1* | 12/2004 | Ray | G06F 21/82 |
| | | | | 713/189 |
| 2005/0138421 | A1* | 6/2005 | Fedronic | G06F 21/32 |
| | | | | 726/4 |
| 2005/0144468 | A1* | 6/2005 | Northcutt | G06F 21/85 |
| | | | | 713/192 |
| 2006/0236117 | A1* | 10/2006 | Lazaridis | H04W 12/041 |
| | | | | 713/185 |
| 2007/0050294 | A1* | 3/2007 | Trottier | G06F 21/10 |
| | | | | 705/50 |
| 2007/0214369 | A1* | 9/2007 | Roberts | G06F 21/79 |
| | | | | 713/192 |
| 2007/0220279 | A1* | 9/2007 | Northcutt | H04L 63/04 |
| | | | | 713/193 |
| 2008/0301433 | A1* | 12/2008 | Vito | H04L 63/0853 |
| | | | | 713/168 |
| 2009/0070593 | A1* | 3/2009 | Boshra | G06F 21/32 |
| | | | | 713/186 |
| 2011/0258426 | A1* | 10/2011 | Mujtaba | G06F 21/57 |
| | | | | 713/168 |
| 2012/0084806 | A1* | 4/2012 | Fahrny | H04L 63/06 |
| | | | | 725/31 |
| 2014/0122901 | A1* | 5/2014 | Bilke | G06F 21/60 |
| | | | | 713/193 |
| 2014/0164779 | A1* | 6/2014 | Hartley | H04L 9/0866 |
| | | | | 713/176 |
| 2014/0344571 | A1* | 11/2014 | Adam | H04L 63/0428 |
| | | | | 713/165 |
| 2015/0039890 | A1* | 2/2015 | Khosravi | H04L 9/0838 |
| | | | | 713/171 |
| 2015/0046702 | A1 | 2/2015 | Paaske et al. | |
| 2016/0154973 | A1* | 6/2016 | Ingalls | H04L 9/0894 |
| | | | | 726/1 |
| 2016/0156462 | A1* | 6/2016 | Winslow | H04L 9/0891 |
| | | | | 380/279 |
| 2016/0285638 | A1 | 9/2016 | Pearson et al. | |
| 2016/0308677 | A1* | 10/2016 | Thom | H04L 9/3234 |
| 2017/0048214 | A1* | 2/2017 | Winslow | H04L 9/0891 |
| 2017/0085374 | A1* | 3/2017 | Chen | H04L 9/083 |
| 2017/0195368 | A1* | 7/2017 | Le Saint | G06F 21/123 |
| 2018/0183581 | A1* | 6/2018 | Elbaz | G09C 1/00 |
| 2018/0357406 | A1 | 12/2018 | Bolotin et al. | |
| 2022/0329415 | A1* | 10/2022 | Martin | H04L 9/0841 |

OTHER PUBLICATIONS

Search Query Report from IP.com (performed Sep. 9, 2021) (Year: 2021).*

Search Query Report from IP.com (performed Jan. 4, 2022) (Year: 2022).*

English Translation of CN103457722 (downloaded from EPO Jul. 15, 2022) (Year: 2013).*

Search Query Report from IP.com (performed Jul. 15, 2022) (Year: 2022).*

Search Query Report from IP.com (performed Jan. 11, 2023) (Year: 2023).*

"What are Opal 2.0-Compliant SEDs?", Retrieved From: https://www.atpinc.com/blog/teg-opal-encrytion-sed-self-encryption-drive, Jul. 25, 2019, 3 Pages.

Constantin, Lucian, "Self-Encrypting Drives are Hardly any Better than Software-Based Encryption", Retrieved From: https://www.pcworld.com/article/3004670/self-encrypting-drives-are-hardly-any-better-than-software-based-encryption.html, Nov. 12, 2015, 5 Pages.

"International Search Report and Written Opinion Issued in PCT Application No. PCT/US21/014037", dated Apr. 21, 2021, 12 Pages.

* cited by examiner

PROTECTING DEVICE DETACHMENT WITH BUS ENCRYPTION

BACKGROUND

As data centers increase for cloud computing and/or data centers move towards remote locations, large amounts of computer devices may become vulnerable to physical attacks. Stored data on the computer devices may be leaked by physical access means. In addition, attackers may use disk data may be tampered with using physical access means and used to mount attacks on computer devices.

These and other problems exist in protecting stored data from physical attacks.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a computer device. The computer device may include at least one memory to store data and instructions; at least one removable device that stores data and instructions; and at least one processor in communication with the at least one memory and the at least one removable device, wherein the at least one processor is operable to: establish an encryption protocol to encrypt data transmitted over a bus to the at least one removable device; transmit encrypted data over the bus to the at least one removable device using the encryption protocol; establish unlock operations for the at least one removable device using the encryption protocol; and perform storage requests at the at least one removable device for the encrypted data.

Another example implementation relates to a method. The method may include establishing, via at least one processor on a computer device, an encryption protocol to encrypt data transmitted over a bus to at least one removable device in communication with the computer device. The method may include transmitting encrypted data over the bus to the at least one removable device using the encryption protocol. The method may include establishing unlock operations for the at least one removable device using the encryption protocol. The method may include performing storage requests at the at least one removable device for the encrypted data.

Another example implementation relates to a computer-readable medium storing instructions executable by a computer device. The computer-readable medium may include at least one instruction for causing the computer device to establish an encryption protocol to encrypt data transmitted over a bus to at least one removable device in communication with the computer device. The computer-readable medium may include at least one instruction for causing the computer device to transmit encrypted data over the bus to the at least one removable device using the encryption protocol. The computer-readable medium may include at least one instruction for causing the computer device to establish unlock operations for the at least one removable device using the encryption protocol. The computer-readable medium may include at least one instruction for causing the computer device to perform storage requests at the at least one removable device for the encrypted data.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

DETAILED DESCRIPTION

This disclosure generally relates to devices and methods for protecting data from physical attacks. As data centers increase for cloud computing and/or data centers move towards remote locations, large amounts of computer devices may become vulnerable to physical attacks. Physical attacks may include removing storage devices of computer devices and accessing data stored on the storage devices. As such, any stored data may be leaked by physical access means. For example, any consumer data stored in the data centers may be accessed and/or leaked during a physical attack.

Currently, even if data is encrypted on a storage device and the storage device is physically removed or otherwise detached from a computer device, the key for unlocking the data is stored on the storage device until the next power cycle occurs. An attacker may connect a new Peripheral Component Interconnect (PCI) bus or other type of bus to the storage disk without removing power from the storage device and the storage device may remain unlocked and data may be accessed by the attacker using the new PCI bus.

In addition, physical attacks may include removing or otherwise detaching storage devices of computer devices and tampering with or modifying the data on the storage devices and reinserting the storage devices into the computer devices to mount attacks on the computer devices.

Moreover, even if data is encrypted on the disk, currently data in transfer between the removable storage device and a PCI root complex of a computer device is unprotected. As such, an attacker may be able to access and/or tamper with the data in flight between the removable storage device and the PCI root complex. If the central processing unit (CPU) performs all encryption or decryption operations using software to encrypt the data prior to storage, the storage disk may be unaware of the encryption and the data in transit across the PCI bus is encrypted. However, a significant performance penalty may occur in the processing of the data up to, for example, 30% in increased processing time of the data.

The present disclosure may provide a boundary between an attacker with physical access to computer devices and the data stored on a removable device. The present disclosure may use a plurality of keys to encrypt the data stored on the removable device.

In an implementation, the present disclosure may use a session key negotiated between the CPU and the removable storage disk to encrypt and authenticate the data transmitted between the CPU and the removable storage disk. As such, the data moving between the CPU and the removable storage disk on the bus is encrypted. In an implementation, the present disclosure may further use client authentication, device authentication, CPU authentication, and/or mutual authentication (e.g., both client and device authentication) to generate the session key.

The session key may be used to authenticate the CPU with the removable storage disk for communication to occur between the CPU and the removable storage disk. Thus, even if the removal storage disk is detached from the computer device, the data on the removal storage disk may inaccessible without the session key to instruct the removable storage disk to access the data.

In addition, the present disclosure may use a disk at rest key to encrypt the data stored on the removable device. The disk at rest key and the session key may be stored on the removable device, for example, in a silicone die or other secure memory that may store the disk at rest key and the session key separate from memory on the removable device. By using a medium other than memory to store the disk at rest key and the session, another layer of security may be added to prevent the physical removal of and/or the reading of the disk at rest key and the session key during an attack on the removable device.

As such, the present disclosure may protect data at rest stored on the storage device to ensure that an external attacker with physical access to the removable device is unable to read and/or modify the data when the removable device is detached from the computer device. In addition, the present disclosure may protect data in flight to ensure that data is encrypted while in transit between a storage device and a root complex in the PCI bus, and thus, preventing sniffing of the data in transit. The present disclosure may also maintain similar and/or the same performance for processing data relative to transmitting unprotected data via the bus.

Figure 1:
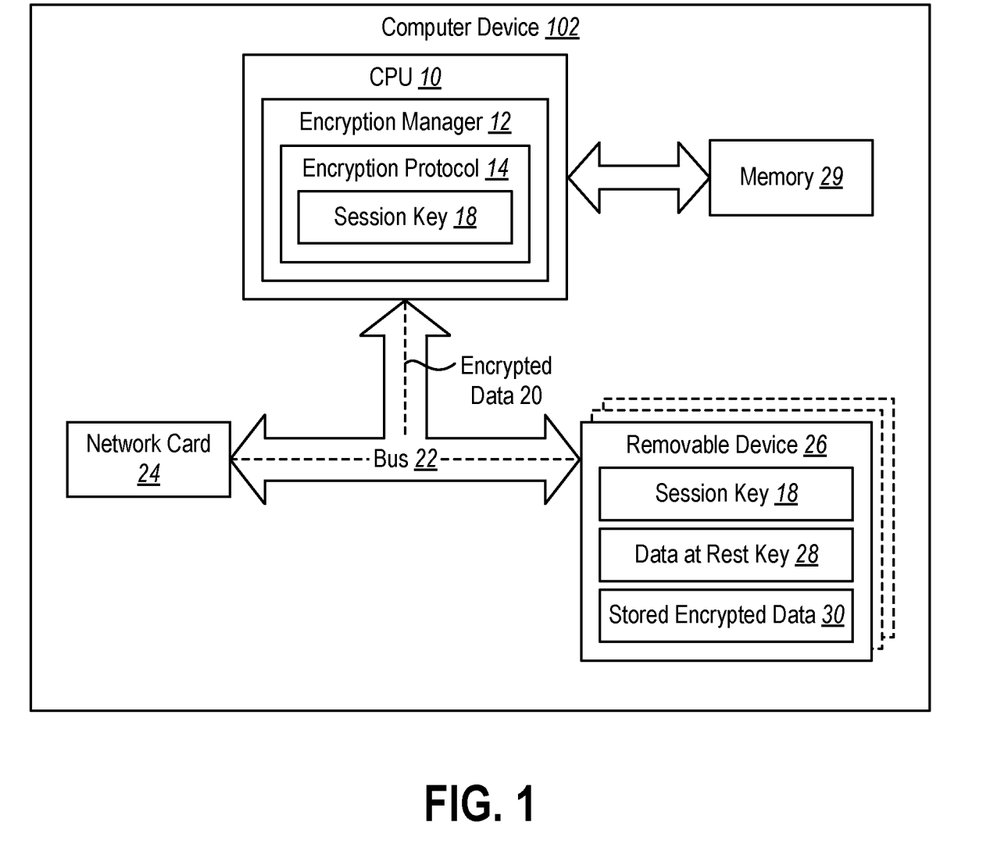
FIG. 1 is a schematic diagram of an example computer device in accordance with an implementation of the present disclosure.

Referring now to FIG. 1, illustrated is an example computer device 102 for use with protecting data from physical attacks. Computer device 102 may include one or more removable devices 26 that may be removed from computer device 102, for example, by an attacker with physical access to computer device 102. The one or more removable devices 26 may include, for example, a flash memory, a flash disk, a hard disk drive (HDD), a solid state drive (SSD), a non-volatile memory, a card, and/or other peripheral devices in communication with computer device 102.

Physical attacks may include removing one or more removable devices 26 of computer device 102 and accessing data stored on the removable devices 26. In addition, physical attacks may include removing one or more removable devices 26 of computer device 102 and tampering with or modifying the data on the removable devices 26. The removable devices 26 may be reinserted into computer device 102 to mount an attack on computer device 102.

Computer device 102 may refer to one or more host computers in a data center or other environment. Computer device 102 may also refer to one or more servers in a data center or other environment. Computer device 102 may also refer to various types of computing devices. For example, computer device 102 may include a mobile device such as a mobile telephone, a smart phone, a personal digital assistant (PDA), a tablet, or a laptop. Additionally, or alternatively, computer device 102 may include one or more non-mobile devices such as a desktop computer, server device, gaming devices, or other non-portable device. In one or more implementations, computer device 102 includes graphical user interfaces thereon (e.g., a screen of a mobile device). In addition, or as an alternative, computer device 102 may be communicatively coupled (e.g., wired or wirelessly) to a display device having a graphical user interface thereon for providing a display of content. Computer device 102 may include features and functionality described below in connection with FIG. 4.

Computer device 102 may include a CPU 10 in communication with a memory 29. Memory 29 of computer device 102 may be configured for storing data and/or computer-executable instructions defining and/or associated with an operating system, and CPU 10 may execute the operating system. An example of memory 29 can include, but is not limited to, a type of memory usable by a computer, such as random access memory (RAM), read only memory (ROM), tapes, magnetic discs, optical discs, volatile memory, non-volatile memory, and any combination thereof. An example of CPU 10 can include, but is not limited to, any processor specially programmed as described herein, including a controller, microcontroller, application specific integrated circuit (ASIC), field programmable gate array (FPGA), system on chip (SoC), or other programmable logic or state machine.

CPU 10 may also communicate with one or more removable devices 26 and/or one or more network cards 24 via a bus 22, such as, but not limited to, a PCI bus. CPU 10 may transmit data via bus 22 to the one or more removable devices 26 and/or one or more network cards 24.

CPU 10 may also include an encryption manager 12 that may determine one or more encryption protocols 14 for transforming bus 22 into an encrypted communication channel between CPU 10 and the one or more removable devices 26 and/or network cards 24 to securely transmit encrypted data 20 over bus 22. The one or more encryption protocols 14 may include, but are not limited to, determining a negotiation for a key to use during data encryption, identifying required data formats to know what data may be encrypted data and/or what data may be routing information, identifying what messages are data messages, and/or identifying what messages are key exchange messages. One example encryption protocol 14 may include negotiating with the one or more removable devices 26 a session key 18 to use with the data transfer between CPU 10 and the one or more removable devices 26. The session key 18 may be directly negotiated with the one or more removable devices 26 without the use of a middle entity. In an implementation, each removable device 26 may have a different session key 18. As such, different session keys 18 may be negotiated for each removable device 26 and one key exchange may occur per removable device 26. In another implementation, a single session key 18 may be distributed by a service to the one or more removeable devices 26 so that the one or more removeable devices 26 may share the same session key 18. For example, the one or more removable devices 26 may securely request the session key 18 from the service. The session key 18 may be used to encrypt and/or decrypt data transmitted via bus 22 between CPU 10 and the one or more removable devices 26. The encrypted data 20 in transit via bus 22 may not be visible to an attacker since the session key 18 may be unavailable to the attacker where only the CPU 10 and the one or more removable devices 26 know the session key 18. As such, the encrypted data 20 may be secure while being transferred through bus 22 and may not be stolen, inspected, and/or modified during transmission.

Another example encryption protocol 14 may include performing a single authentication with CPU 10 and/or the one or more removable devices 26. For example, CPU 10 may directly authenticate with the one or more removable devices 26. Alternatively, the one or more removable devices 26 may directly authenticate with CPU 10. The authentication may be used to verify CPU 10 and/or the one or more removable devices 26 and to establish a symmetric key for the session key 18 so that CPU 10 and the one or more removable devices 26 may communicate with each other.

Another example encryption protocol 14 may include performing a mutual authentication between CPU 10 and/or the one or more removable devices 26 to verify both CPU 10 and the one or more removable devices 26. Both CPU 10 and the one or more removable devices 26 may authenticate with each other and establish a symmetric key for the session key 18.

Another example encryption protocol 14 may include performing a client authentication where a third-party client authenticates with CPU 10 and/or the one or more removable devices 26 to verity the client and establish a symmetric key for a session key 18 so that CPU 10 and/or the one or more removable devices 26 may communicate with the client.

The encryption protocols 14 may be used in combination to establish a secure communication channel via bus 22. The encryption protocols 14 may also be used to unlock the one or more removable devices 26 to perform storage requests operations on the one or more removable devices 26. For example, CPU 10 may use the encryption protocols 14 to instruct the removable devices 26 to access stored encrypted data 30 on the removable devices 26. In addition, CPU 10 may use the encryption protocols 14 to instruct removable devices 26 to store encrypted data 30 on the removable device 26.

As such, even if the one or more removable devices 26 are detached from computer device 102, the stored encrypted data 30 on the removable devices 26 may not be accessed without using the encryption protocols 14 to unlock the removable devices 26 and instruct the removable devices 26 to read the stored encrypted data 30. Thus, an attacker with physical access to the removable devices 26 may not access the stored encrypted data 30 on the removable devices 26 without the session key 18.

Figure 2:
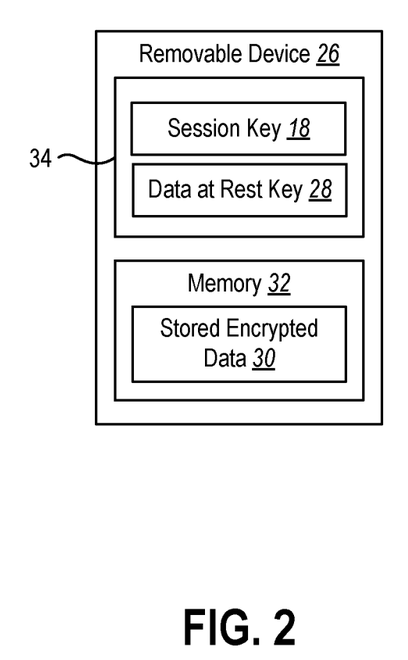
FIG. 2 is a schematic diagram of an example removable device for use with a computer device in accordance with an implementation of the present disclosure.

The removable storage devices 26 may also include a data at rest key 28 stored on the removable storage devices 26 for performing a further encryption of the stored encrypted data 30. Referring now to FIG. 2, an example removable device 26 may include a memory 32 for storing the encrypted data 30 on the removable device 26. In addition, removable device 26 may include an area 34 separate from memory 32. Area 34 may include, but is not limited to, a silicone die, flip-flops, synchronous dynamic random access memory (SDRAM), portions of a silicon die, and/or on fuses. Other examples of area 34 may include other forms of secure memory.

In an implementation, the session key 18 and/or the data at rest key 28 may be stored in area 34. By storing the session key 18 and/or the data at rest key 28 in a secure area 34 separate from memory 32, it may be more difficult to physically remove the session key 18 and/or the data at rest key 28 from the removable device 26. In addition, if an attack occurred on memory 32, the session key 18 and/or the data at rest key 28 may not be read from memory 32 during the attack since the session key 18 and/or the data at rest key 28 are not stored in memory 32.

A separate data at rest key 28 may be stored on each removable device 26 and may be used to apply another layer of encryption to the stored encrypted data 30 on the removable devices 26. Thus, the removable storage devices 26 may perform another layer of encryption on the stored encrypted data 30 using the data at rest key 28 and the stored encrypted data 30 may be decrypted using the data at rest key 28 when a read operation is performed on the removeable storage device 26. By further encrypting the stored encrypted data 30 another layer of protection may be provided to the stored encrypted data 30 if a physical attack occurs on computer device 102 and the removable devices 26 are detached from computer device 102. Moreover, by securely storing the keys used to encrypt the data stored on removable devices 26 ensures that an external attacker with physical access to removable device 26 is unable to read and/or modify the data when removable device 26 is detached from computer device 102.

Computer device 102 may also protect data in flight to ensure that data is encrypted while in transfer between the removable devices 26 and CPU 10 via bus 22, and thus, preventing sniffing of the data in transit over bus 22.

Figure 3:
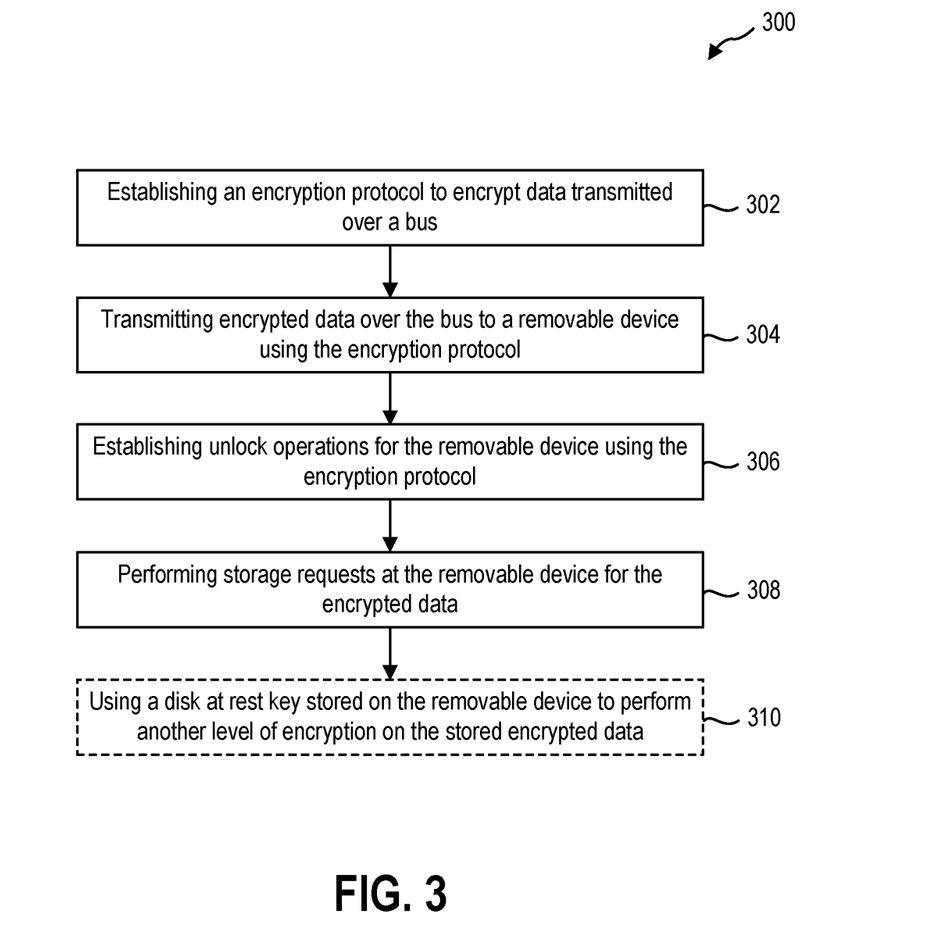
FIG. 3 is a flow diagram of an example method flow for protecting data in accordance with an implementation of the present disclosure.

Referring now to FIG. 3, an example method 300 may be used by computer device 102 (FIG. 1) for protecting data stored on removable devices 26 (FIG. 1) in communication with computer device 102 from physical attacks. The actions of method 300 may be discussed below with reference to the architectures of FIGS. 1 and 2.

At 302, method 300 may include establishing an encryption protocol to encrypt data transmitted over a bus. CPU 10 of computer device 102 may include an encryption manager 12 that may determine one or more encryption protocols 14 to securely transmit data over bus 22 between CPU 10 and one or more removable devices 26. The one or more encryption protocols 14 may transform bus 22 into an encrypted communication channel between CPU 10 and the one or more removable devices 26 and/or network cards 24 to securely transmit encrypted data 20 over bus 22. The one or more encryption protocols 14 may include, but are not limited to, determining a negotiation for a key to use during data encryption, identifying required data formats to know what data may be encrypted data and/or what data may be routing information, identifying what messages are data messages, and/or identifying what messages are key exchange messages. One example encryption protocol 14 may include negotiating with the one or more removable devices 26 a session key 18 to use with the data transfer. The session key 18 may be directly negotiated with the one or more removable devices 26 without the use of a middle entity. In an implementation, each removable device 26 may have a unique session key 18. As such, different session keys 18 may be negotiated for each removable device 26 and one key exchange may occur per removable device 26. In another implementation, a single session key 18 may be distributed by a service to the one or more removeable devices 26 so that the one or more removeable devices 26 may use the same session key 18. For example, the one or more removable devices 26 may securely request the session key 18 from the service.

Another example encryption protocol 14 may include performing a single authentication with CPU 10 and/or the one or more removable devices 26 to verify CPU 10 and/or the one or more removable devices 26 and to establish a symmetric key for the session key 18 so that CPU 10 and/or the one or more removable devices 26 may communicate securely with each other. Another example encryption protocol 14 may include performing a mutual authentication between CPU 10 and/or the one or more removable devices 26 to verify both CPU 10 and the one or more removable devices 26 and to establish a symmetric key for the session key 18 so that CPU 10 and/or the one or more removable devices 26 may communicate securely with each other.

At 304, method 300 may also include transmitting encrypted data over the bus to a removable device using the encryption protocol. The session key 18 may be used to encrypt and/or decrypt data transmitted via bus 22 between CPU 10 and the one or more removable devices 26. The encrypted data 20 in transit via bus 22 may not be visible to an attacker since the session key 18 may only be known by CPU 10 and the one or more removable devices 26 and unavailable to the attacker. As such, the encrypted data 20 may be secure while being transferred through bus 22 and may not be stolen, inspected, and/or modified during transmission.

At 306, method 300 may include establishing unlock operations for the removable device using the encryption protocol. CPU 10 may use the encryption protocols to verify and/or authenticate CPU 10 with the removable device 26 and establish a secure communication session via bus 22 to communicate between CPU 10 and removable device 26.

At 308, method 300 may include performing storage requests at the removable device for the encrypted data. For example, CPU 10 may use the encryption protocols 14 to instruct the removable devices 26 to access stored encrypted data 30 on the removable devices 26. In addition, CPU 10 may use the encryption protocols 14 to instruct removable devices 26 to store encrypted data 30 on the removable device 26.

As such, even if the one or more removable devices 26 are detached from computer device 102, the stored encrypted data 30 on the removable devices 26 may not be accessed without using the encryption protocols 14 to unlock the removable devices 26 and instruct the removable devices 26 to read the stored encrypted data 30. Thus, an attacker with physical access to the removable devices 26 may not access the stored encrypted data 30 on the removable devices 26 without the session key 18.

At 310, method 300 may optionally include using a disk at rest key stored on the removable device to perform another level of encryption on the stored encrypted data. The removable devices 26 may also include a data at rest key 28 stored on the removable storage devices 26 for performing a further encryption of the stored encrypted data 30. As such, the stored encrypted data 30 may be further encrypted by the removable storage devices 26 to further protect the data from unwanted access and/or tampering when the removable device 26 is detached from computer device 102.

In an implementation, the data at rest key 28 and/or the session key 18 may be stored in an area 34 separate from a memory 32 of the removal storage device 26. The area 34 may include, but is not limited to, a silicone die, flip-flops, synchronous dynamic random access memory (SDRAM), portions of a silicon die, on fuses, and/or other form of secure memory. By storing the data at rest key 28 and/or the session key 18 in a secure area 34 separate from memory 32, it may be more difficult to physically remove the data at rest key 28 and/or the session key 18 from the removable device 26. As such, if the removable device 26 is detached from computer device 102, the data at rest key 28 and/or the session key 18 may be unable to be accessed and/or read. In addition, if an attack occurred on memory 32, the session key 18 and/or the data at rest key 28 may not be read from memory 32 during the attack since the session key 18 and/or the data at rest key 28 are stored separate from memory 32.

As such, method 300 may be used to protect data stored in removable devices 26 from physical attacks when the removable devices are detached from computer device 102. In addition, method 300 may be used to protect data in transit to or from removal devices 26 from physical attacks.

Figure 4:
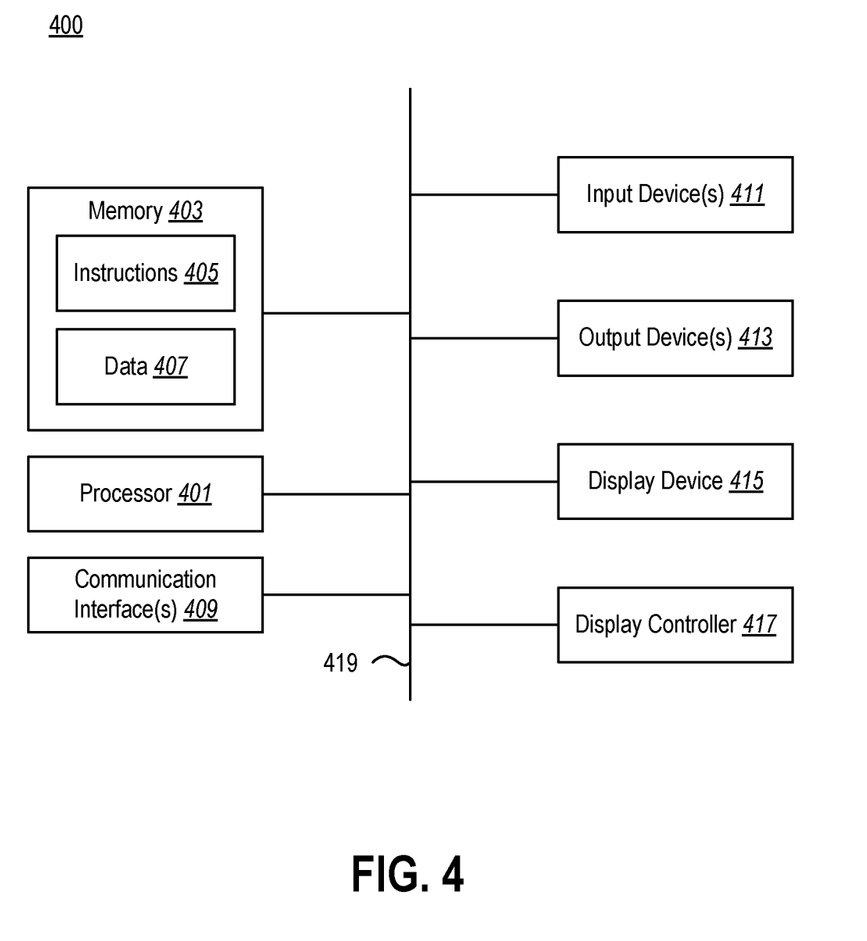
FIG. 4 illustrates certain components that may be included within a computer system.

FIG. 4 illustrates certain components that may be included within a computer system 400. One or more computer systems 400 may be used to implement the various devices, components, and systems described herein.

The computer system 400 includes a processor 401. The processor 401 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 401 may be referred to as a central processing unit (CPU). Although just a single processor 401 is shown in the computer system 400 of FIG. 4, in an alternative configuration, a combination of processors (e.g., an ARM and DSP) could be used.

The computer system 400 also includes memory 403 in electronic communication with the processor 401. The memory 403 may be any electronic component capable of storing electronic information. For example, the memory 403 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 405 and data 407 may be stored in the memory 403. The instructions 405 may be executable by the processor 401 to implement some or all of the functionality disclosed herein. Executing the instructions 405 may involve the use of the data 407 that is stored in the memory 403. Any of the various examples of modules and components described herein may be implemented, partially or wholly, as instructions 405 stored in memory 403 and executed by the processor 401. Any of the various examples of data described herein may be among the data 407 that is stored in memory 403 and used during execution of the instructions 405 by the processor 401.

A computer system 400 may also include one or more communication interfaces 409 for communicating with other electronic devices. The communication interface(s) 409 may be based on wired communication technology, wireless communication technology, or both. Some examples of communication interfaces 409 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 400 may also include one or more input devices 411 and one or more output devices 413. Some examples of input devices 411 include a keyboard, mouse, microphone, remote control device, button, joystick, trackball, touchpad, and lightpen. Some examples of output devices 413 include a speaker and a printer. One specific type of output device that is typically included in a computer system 400 is a display device 415. Display devices 415 used with embodiments disclosed herein may utilize any suitable image projection technology, such as liquid crystal display (LCD), light-emitting diode (LED), gas plasma, electroluminescence, or the like. A display controller 417 may also be provided, for converting data 407 stored in the memory 403 into text, graphics, and/or moving images (as appropriate) shown on the display device 415.

The various components of the computer system 400 may be coupled together by one or more buses, which may include a power bus, a control signal bus, a status signal bus, a data bus, etc. For the sake of clarity, the various buses are illustrated in FIG. 4 as a bus system 419.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer device, comprising:
at least one memory to store data and instructions; and
at least one processor in communication with the at least one memory and a first removable device of a plurality of removable devices that each store data and instructions, wherein the at least one processor is operable to:
establish an encryption protocol to encrypt data transmitted over a bus to the first removable device by communications between the at least one processor and the first removable device and to encrypt data transmitted over the bus to a second removable device of the plurality of removable devices, wherein the encryption protocol includes establishing a first session key between the at least one processor and the first removable device, wherein each removable device negotiates with the at least one processor for a different session key;
transmit encrypted data over the bus to the first removable device using the encryption protocol, wherein the first removable device is configured such that, after the first removable device is detached from the computer device, the encrypted data on the first removable device is inaccessible until the encryption protocol instructs the first removable device to access the encrypted data in a memory using the first session key stored in a secure memory separate from the memory;
establish unlock operations for the first removable device using the encryption protocol, wherein the first session key is stored on the first removable device in the secure memory that is separate from the memory that stores the encrypted data, and the unlock operations use the first session key to unlock the first removable device to read the encrypted data; and
perform storage requests at the first removable device for the encrypted data.

2. The computer device of claim 1, wherein the at least one processor is further operable to:
use a disk at rest key stored on the first removable device to perform another level of encryption on the encrypted data on the first removable device.

3. The computer device of claim 2, wherein the disk at rest key is stored in the secure memory on the first removable device.

4. The computer device of claim 1, wherein the first removable device includes one or more of a flash memory, a flash disk, a hard disk drive, a solid state drive, a non-volatile memory, or a card.

5. The computer device of claim 1, wherein the bus is a Peripheral Component Interconnect (PCI) bus.

6. The computer device of claim 1, wherein the encryption protocol includes using one or more of a client authentication, a device authentication, or a mutual authentication between the at least one processor and the first removable device.

7. A method, comprising:
establishing, via at least one processor on a computer device, an encryption protocol to encrypt data transmitted over a bus to a first removable device of a plurality of removable devices and to encrypt data transmitted over the bus to a second removable device of the plurality of removable devices in communication with the computer device by communications between the at least one processor and the first removable device, wherein the encryption protocol includes establishing a first session key with the at least one processor and the first removable device, wherein each removable device negotiates with the at least one processor for a different session key;

transmitting encrypted data over the bus to the first removable device using the encryption protocol;

after the first removable device is detached from the computer device the encrypted data on the first removable device is inaccessible until the encryption protocol instructs the first removable device to access the encrypted data in a memory using the first session key stored in a secure memory separate from the memory that stores the encrypted data;

establishing unlock operations for the first removable device using the encryption protocol, wherein the first session key is stored on the first removable device in the secure memory, and the unlock operations use the first session key to unlock the first removable device to read the encrypted data; and performing storage requests at the first removable device for the encrypted data.

8. The method of claim 7, further comprising:

using a disk at rest key stored on the first removable device to perform another level of encryption on the encrypted data on the first removable device.

9. The method of claim 8, wherein the disk at rest key is stored in the secure memory on the first removable device.

10. The method of claim 7, wherein the first removable device includes one or more of a flash memory, a flash disk, a hard disk drive, a solid state drive, a non-volatile memory, or a card.

11. The method of claim 7, wherein the bus is a Peripheral Component Interconnect (PCI) bus.

12. The method of claim 7, wherein the encryption protocol includes using one or more of a client authentication, a device authentication, or a mutual authentication between the at least one processor and the first removable device.

13. A method, comprising:

establishing a plurality of session keys to encrypt or decrypt data transmitted over a bus from a computer device to a plurality of removable devices in communication with the computer device, wherein each removable device of the plurality of removable devices directly negotiates a session key of the plurality of session keys with at least one processor of the computer device, wherein the session key negotiated is different for each removable device;

transmitting encrypted data over the bus to a respective removable device using the session key negotiated for the respective removable device;

after the respective removable device is detached from the computer device the encrypted data on the respective removable device is inaccessible until an encryption protocol instructs the respective removable device to access the encrypted data in a memory using the session key stored in a secure memory separate from the memory;

establishing unlock operations for the respective removable device using the session key to unlock the respective removable device to read the encrypted data, wherein the session key is stored on the respective removable device in the secure memory separate from the memory that stores the encrypted data; and performing storage requests at the respective removable device for the encrypted data.

14. The method of claim 13, wherein the unlock operations instruct the respective removable device to access the encrypted data on the respective removable device.

15. The method of claim 13, wherein one session key exchange occurs for each removable device of the plurality of removable devices.

16. The method of claim 13, further comprising:

using a disk at rest key stored on the respective removable device, wherein the disk at rest key is stored in the secure memory on the respective removable device to perform another level of encryption on the encrypted data on the respective removable device.

17. The method of claim 13, wherein the plurality of removable devices includes one or more of a flash memory, a flash disk, a hard disk drive, a solid state drive, a non-volatile memory, or a card, and wherein the bus is a Peripheral Component Interconnect (PCI) bus.

18. The computer device of claim 1, wherein the secure memory is a silicon die.

* * * * *